United States Patent [19]

Tsunetoshi et al.

[11] Patent Number: 5,239,100
[45] Date of Patent: Aug. 24, 1993

[54] ANTIBACTERIAL COMPOUNDS CONTAINING GUANIDYL GROUP

[75] Inventors: Honda Tsunetoshi; Akiko Azuma; Akira Nishihara, all of Omiya, Japan

[73] Assignee: Mitsubishi Materials Corporation, Tokyo, Japan

[21] Appl. No.: 996,710

[22] Filed: Dec. 24, 1992

[30] Foreign Application Priority Data

Dec. 28, 1991 [JP] Japan ................... 3-359590
Dec. 28, 1991 [JP] Japan ................... 3-359592

[51] Int. Cl.⁵ ............................................. C07F 7/10
[52] U.S. Cl. ..................................... 556/417; 556/415; 556/424
[58] Field of Search ................. 556/424, 415, 417

[56] References Cited

U.S. PATENT DOCUMENTS

| 3,636,025 | 1/1972 | Barcza | 556/424 |
| 3,940,430 | 2/1976 | Brenner et al. | 556/424 X |
| 4,248,993 | 2/1981 | Takago | 556/424 X |
| 4,954,598 | 9/1990 | Baglidachi et al. | 556/424 X |
| 5,097,053 | 3/1992 | Baglidachi et al. | 556/424 X |

FOREIGN PATENT DOCUMENTS

| 456093A2 | 11/1991 | European Pat. Off. |
| 460385A2 | 12/1991 | European Pat. Off. |
| 45-36320 | 11/1970 | Japan |
| 54-44699 | 12/1979 | Japan |
| 61-17860 | 5/1986 | Japan |
| 2-6489 | 1/1990 | Japan |

Primary Examiner—Paul F. Shaver
Attorney, Agent, or Firm—David G. Conlin; Linda M. Buckley

[57] ABSTRACT

Novel dimethylpolysiloxane compounds having antibacterial activity are disclosed. Biguanidyl group or cyanoguanidyl group are introduced into dimetylpolysiloxane compounds.

5 Claims, No Drawings

ANTIBACTERIAL COMPOUNDS CONTAINING GUANIDYL GROUP

FIELD OF THE INVENTION

The present invention relates to a class of novel compounds containing a guanidyl group, which are useful as antibacterial agents and processes for preparation thereof.

The compounds of this invention are useful as germicides, algicides, antibacterial agents, antimold agents, deodorizers, fiber treatment agents having antiseptic activity, resin modifiers, water repellents, cosmetic materials, mold releases, paint additives, etc.

BACKGROUND OF THE INVENTION

Dimethylpolysiloxane, a typical example of organopolysiloxanes, is known as silicone oil and used as fiber treatment agent, resin modifier, water repellent, cosmetic material, mold release, paint additive, etc. in various industrial fields.

Also, dimethylpolysiloxane in which organic functional groups such as amino, epoxy, hydroxyl, carboxyl, polyoxyalkyl, etc. are introduced at the end of its molecule or side chains thereof, are widely used for various purposes as modified organic silicone.

If dimethylpolysiloxane is provided with antibacterial activity in addition to its inherent lubricating, glossing, surface protection and water repellent effects, the compound will be more useful in various applications. That is, it is considered to introduce substituents having antibacterial activity to dimethylpolysiloxane. However, environments, in which antibacterial activity is required, are varied and requirements for antibacterial spectrum are also varied. Further, low toxicity is prerequisite when the compound is used in an environment, in which it may be in contact with human bodies.

Many and various antibacterial compounds including quaternary ammonium compounds are known. Guanidyl compounds, some of which are known to have biological activity such as antimalarial, are examples of such compounds.

For instance, bisbiguanides, which have biguanidyl groups on both ends of an alkylene chain, have strong germicidal and antibacterial activity and some of them have been widely used as germicides and disinfectants and are studied for a long time.

However, the mechanism of germicidal activity of these compounds is not yet quite clearly understood and presence of the biguanidyl group does not always cause germicidal activity. It is well known that biological activity of biguanide compounds remarkably varies depending on the species of substituents. (Refer to: J. Chem Soc., 729 (1946).) Also it is reported that germicidal activity and antibacterial spectrum of the above-mentioned bisbiguanide compounds are largely influenced by length of the alkylene chain, species of end substituents, etc. (Refer to: Brit. J. Pharmcol. 9, 192 (1954), for instance.)

The object of the present invention is to provide a class of low toxicity antibacterial polysiloxane compounds, which can be applied to the surface of various materials or incorporated in resins and provide them with antibacterial activity.

We prepared a class of novel compounds, which comprise a guanide compound to the molecular end of which high molecular polysiloxane was attached and found that some of them have strong germicidal activity and are practically useful as antibacterial agents. These compounds have at least a guanidyl group, which is of low toxicity to the human body, as an active moiety and thus can be used in a wide range of application field. In these compounds, the germicidal moiety is chemically bonded to high molecular polysiloxane and, therefore, the germicidal activity is maintained for a long time and deleterious effect to the environment and the human body is reduced in comparison with the conventional physical incorporation of a germicidal substance in polymer materials.

DISCLOSURE OF THE INVENTION

The present invention provides organopolysiloxane compounds represented by formula (I):

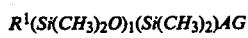

wherein $R^1$ is unsubstituted or substituted lower alkyl group, l is an integer of 1-5000, A is $C_1$-$C_{10}$ alkylene, and G is a biguanidyl group which may have a substituent or a cyanoguanidyl group; or by formula (II):

wherein $R^1$, l, A and G are as defined above, m is an integer of 0-5000, $R^2$ is a lower aminoalkyl group, and n is an integer of 1-5000.

The biguanidyl group can be a salt with an organic acid such as acetic acid, citric acid, gluconic acid, etc. or an inorganic acid such as hydrochloric acid sulfuric acid, etc.

By selecting species of substituents to be attached to the guanidyl group, germicidal effect and antibacterial spectrum of the compound can be varied. The substituent should preferably be any of hydrogen, $C_1$-$C_{20}$ alkyl or phenyl, which may be substituted with halogen, alkyl, fluoroalkyl and alkoxy.

The bonding portion of the silicon atom and the guanidyl group is preferably a $C_1$-$C_{10}$ alkylene group, which may contain a substituent selected from oxy, azo, thio, hydroxymethylene, oxycarbonyl and phenylene, are preferred.

The polysiloxane used in the present invention can have a viscosity of 0.1–1,000,000 cs (25° C.), although 5–50,000 cs (25° C.) is preferred.

Typical examples of the compounds of the present invention are represented by the following formulas, wherein the indication in <> corresponds to the indication of compound in the working examples described below.

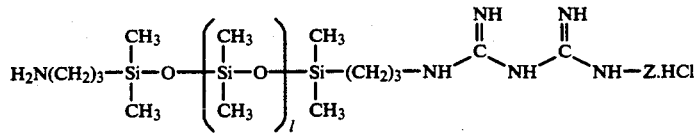

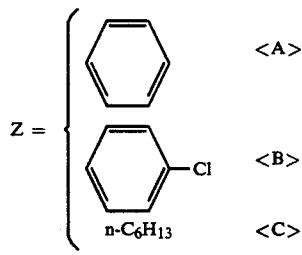

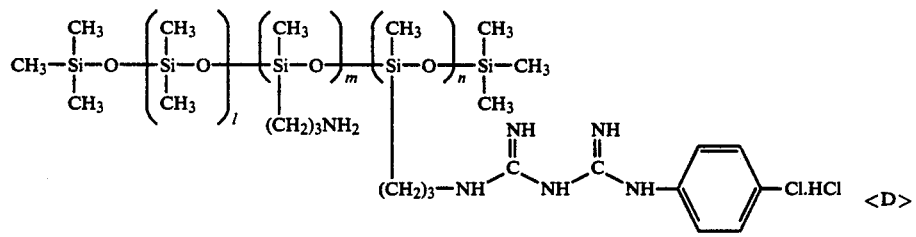

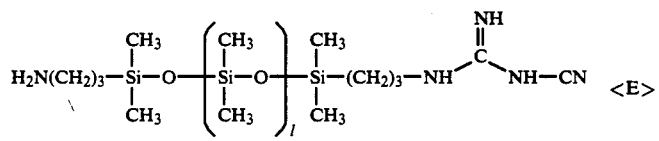

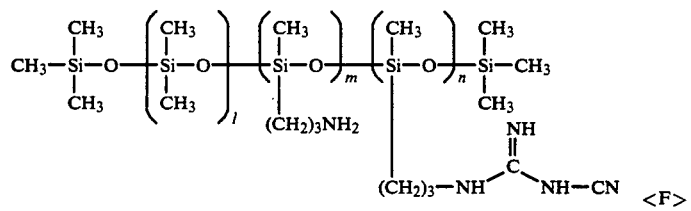

The present invention also provides a process for preparation of the compound of formula (I), wherein G is biguanidyl group, which comprises reacting an organopolysiloxane containing a structural unit:

$R^1(Si(CH_3)_2O)_n(Si(CH_3)_2)AG$ wherein $R^1$, n, A are as defined above and G is a cyanoguanidyl group with an amine represented by formula:

$ZNH_2$ wherein Z is hydrogen, $C_1$-$C_{20}$ alkyl or phenyl, which may be substituted with halogen, alkyl, fluoroalkyl or alkoxy.

The present invention also provides a process for preparation of the compound of formula (I), wherein G is a cyanoguanidyl group, which comprises reacting an organo polysiloxane represented by formula:

$R^1(Si(CH_3)_2O)_n(Si(CH_3)_2)AQ$ wherein $R^1$, n and A are as defined above and Q is an amino group with a compound represented by formula:

$NC-N=C(SCH_3)NH_2$ $NaN(CN)_2$.

The amino of the above formula can be used in the form of a salt. In this case, the acid radical may be removed by treating with a base, if necessary. The reaction of the cyanoguanidyl compound and the amine can be conducted in a solvent. An alcohol such as ethanol, isopropanol, 2-ethoxyethanol, etc.; an ether such as ethyl ether, isopropyl ether, etc.; an aromatic hydrocarbon compound such as benzene, toluene, etc. can be employed.

The reaction temperature is 0°–200° C., preferably 60°–150° C. The reaction time depends on reaction conditions, reactivity of the reactants, etc.

These compounds can be prepared as a salt with an organic or inorganic acid and the salts can be converted to the bases by the treatment with an alkali. Or otherwise, bases can be converted to salts by the treatment with an acid.

The present invention also provides a process for preparation of the compound of formula (II):

$R^1(Si(CH_3)_2O)_l(SiCH_3R^2O)_m(SiCH_3AGO)_n$-
$(Si(CH_3)_3)$ wherein $R^1$, l and A are as defined above, G is a cyanoguanidyl, m is an integer of 0–5000, $R^2$ is a lower aminoalkyl group, and n is an integer of 1–5000, which comprises reacting a compound of formula:

$R^1(Si(CH_3)_2O)_l(SiCH_3R^2O)_m(SiCH_3AGO)_n$-
$(Si(CH_3)_3)$ wherein the R, l, m, n and A are the same as above and Q is an amino group with a compound of formula:

$$NC-N=C(SCH_3)NH_2$$

or a compound of formula:

$$NaN(CN)_2$$

The present invention also provide a process for preparation of the compound of formula (II):

$$R^1(Si(CH_3)_2O)_l(SiCH_3R^2O)_m(SiCH_3AGO)_n-(Si(CH_3)_3)$$

wherein $R^1$, l, A are as defined above G is a biguanidyl, m is an integer of 0–5000, $R^2$ is a lwer aminoalkyl group, and n is an integer of 1–5000, which comprises reacting a compound of formula:, $$R^1(Si(CH_3)_2O)_l(SiCH_3R^2O)_m(SiCH_3AGO)_n-(Si(CH_3)_3)$$

wherein the R, l, m, n and A re the same and G is an cyanoguanidyl group with a compound of formula:

$$ZNH_2$$

wherein Z is as defined above.

In these processes, the reaction conditions are the same as in the case of compounds of formula (I).

The compounds of the present invention containing a guanidyl group or groups can be used in the same manner as conventional polysiloxanes. According to the condition of practical application, the compounds can be diluted with a suitable solvent or additives can be added.

Objects of application of the compounds are not limited. If the compounds are used as fiber treatment agents, cloths, beddings, carpets, etc. will be endowed with antibacterial and deodorizing properties in addition to smooth hand, gloss, softness, water repellency.

SPECIFIC DESCRIPTION OF THE INVENTION

Now the invention will be illustrated by way of working examples. Compounds A–F prepared in Example 1–6 are the above described Compounds A–F.

EXAMPLE 1

Preparation of Compound E

In a 100 ml three-necked flask equipped with a stirrer, a thermometer, a refluxing apparatus and a nitrogen inlet, 10.0 g (11.9 mmol) of a polysiloxane "x22-161A" (marketed by Shin'etsu Kagaku Kogyo KK, functional group equivalent: 840 g/mol, viscosity: 29 cs (25° C.)) 0.69 g (6.0 mmol) of NC—N=C(SCH3)NH2 and 40 ml of isopropanol were placed and the reaction mixture was refluxed for 22 hours in a nitrogen atmosphere. Thus, 10.4 g of light yellow oil was obtained after the solvent was distilled away under reduced pressure. This oil was dissolved in 100 ml of ethyl ether, washed with water twice, and the ether layer was dried over anhydrous sodium sulfate overnight. 7.5 g of purified light yellow oil was obtained.

0.5 g of this oil and 100 ml of ethyl ether were placed in a 300 ml pear-shaped flask and the oil was dissolved at room temperature. 5.0 g of silica gel ("Wakogel C-200" marketed by Wako Junyaku KK) was added to the solution and the mixture was stirred for 1 hour. After the ethyl ether was distilled off, the flask was kept in a dryer of 100° C. for 2 hours. Thus 5.3 g of white powder was obtained.

Antibacterial activity of Compound E was evaluated in accordance with the AATCC-100 test using this silica gel having adsorbed the oil. Klebsiella pneumoniae was used for the test. The result is shown in Table 1.

EXAMPLE 2

Preparation of Compound F

Using 45.2 g (11.9 mmol) of a polysiloxane "KF-864" (marketed by Shin'etsu Kagaku Kogyo KK, functional group equivalent: 3800 g/mol, viscosity: 1700 cs (25° C.)), the procedures of Example 5 were repeated, and 40.1 g of light yellow oil was obtained. 0.5 g of this oil and 100 ml of ethyl ether were placed in a 300 ml pear-shaped flask equipped with a stirrer, and the oil was dissolved at room temperature. 5.0 g of a silica gel ("Wakogel C-200" marketed by Wako Junyaku KK) was added to the solution and the mixture was stirred for 1 hour. After the ethyl ether was distilled off, the flask was kept in a dryer of 100° C. for 2 hours. Thus the antibacterial activity of Compound F was evaluated in accordance with the AATCC-100 test using this silica gel having adsorbed the oil. Klebsiella pneumoniae was used for the test. The result is shown in Table 1.

EXAMPLE 3

Preparation of Compound A

In a 100 ml three-necked flask equipped with a stirrer, a thermometer, a refluxing apparatus and a nitrogen inlet, 6.8 g (4.1 mmol) of the product of Example 1, 0.5 g (4.1 mmol) of aniline hydrochloride and 40 ml of isopropanol were placed and the reaction mixture was refluxed for 18 hours in a nitrogen atomophere. Thus, 6.9 g of light yellow oil was obtained after the solvent was distilled away under reduced pressure. This oil was dissolved in 100 ml of ethyl ether, washed with water twice, and the ether layer was dried over anhydrous sodium sulfate overnight. 5.8 g of purified light yellow oil was obtained after the ether was distilled away.

0.5 g of this oil and 100 ml of ethyl ether were placed in a 300 ml pear-shaped flask and stirred. Thus the oil was dissolved at room temperature. To this solution, 5.0 g of silica gel ("Wakogel C-200" marketed by Wako Junyaku KK) was added and the mixture was stirred for 1 hour. After the ethyl ether was distilled off, the flask was kept in a dryer of 100° C. for 2 hours. Thus 5.3 g of white powder was obtained.

Using this silica gel having adsorbed the oil, its antibacterial activity was evaluated in accordance with the AATCC-100 test. Klebsiella pneumoniae was used for the test. The results are shown in Table 1.

EXAMPLE 4

Preparation of Compound B

Using 0.66 g (4.1 mmol) of p-chloroaniline hydrochloride instead of aniline hydrochloride, 5.6 g of light yellow oil was obtained and its antibacterial activity was evaluated in the same manner as Example 1. The result is whown in Table 1.

EXAMPLE 5

Preparation of Compound C

Using 0.56 g (4.1 mmol) of n-hexylamine hydrochloride instead of aniline hydrochloride, 5.3 g of light yellow oil was obtained and its antibacterial activity was evaluated in the same manner as in Example 1. The result is shown in Table 1.

EXAMPLE 6

Preparation of Compound D

In a 100 ml three necked flask equipped with a stirrer, a thermometer, a refluxing apparatus and a nitrogen inlet, 10.0 g (1.3 mmol) of the product of Example 2, 0.22 g (1.3 mmol) of p-chloroaniline hydrochloride and 40 ml of isopropanol were placed and the reaction mixture was refluxed for 28 hours in a nitrogen atmosphere. Thus, 8.9 g of light yellow oil was obtained after the solvent was distilled away under reduced pressure. This oil was dissolved in 100 ml of ethyl ether, washed with water twice, and the ether layer was dried over anhydrous sodium sulfate overnight. 5.8 g of purified light yellow oil was obtained.

This oil was adsorbed on silica gel and its antibacterial activity was evaluated in the same manner as in Example 1. The result is shown in Table 1.

COMPARATIVE EXAMPLE 1

The starting material polysiloxane "x22-161A" of Shin'etsu Kagaku Kogyo KK was adsorbed on silica gel and its antibacterial activity was evaluated in the same manner and the result is shown in Table 1.

COMPARATIVE EXAMPLE 2

The starting material polysiloxane "KF-865" of Shin'tsu Kagaku Kogyo KK was adsorbed on silica gel and its antibacterial activity was evaluated in the same manner and the result is shown in Table 1.

TABLE 1

| Compounds | Sterilization (%) |
|---|---|
| Ex. 1 | 85.6 |
| Ex. 2 | 88.9 |
| Ex. 3 | 98.9 |
| Ex. 4 | 99.9 |
| Ex. 5 | 91.5 |
| Ex. 6 | 99.9 |
| Comp. Ex. 1 | 0 |
| comp. Ex. 2 | 0 |

The antibacterial compounds of the present invention can provide various materials with germicidal and antibacterial properties in addition to the specific characteristic of polysiloxane compounds. Utilization in many industrial fields is expected. Also the compounds of the present invention are useful as intermediates for synthesis of various guanidyl containing polysiloxane compounds.

What we claim is:

1. Organopolysiloxane compounds represented by the formula (I):

$$R^1(Si(CH_3)_2O)_2O)_1{}^1(Si(CH_3)_2)AG$$

wherein $R^1$ is unsubstituted or substituted lower alkyl group, l is an integer of 1-5000, A is $C_1$-$C_{10}$ alkylene, and G is a biguanidyl group which may have a substituent or cyanoguanidyl group; or by formula (II):

$$R^1(Si(CH_3)_2O)_1(SiCH_3R^2O)_m(SiCH_3AG)_n(Si(CH_3)_3$$

wherein $R^1$, l, A and G are as defined above, m is an integer of 0-5000, $R^2$ is a lower aminoalkyl group, and n is an integer of 1-5000.

2. Process for preparation of the compound of formula (I), wherein G is biguanidyl group, which comprises reacting an organosiloxane containing a structural unit:

$$R^1(Si(CH_3)_2O)_n(Si(CH_3)_2)AG$$

wherein $R^1$, n, A are as defined above and G is a cyanoguanidyl group with an amine represented by formula $$ZNH_2$$

wherein Z is hydrogen, $C_1$-$C_{20}$ alkyl or phenyl, which may be substituted with halogen, alkyl, fluoroalkyl or alkoxy.

3. Process for preparation of the compound of formula (I), wherein G is a cyanoguanidyl group, which comprises reacting an organosiloxane containing a structural unit:

$$R^1(Si(CH_3)_2O)_1(Si(CH_3)_2)AQ$$

wherein $R^1$ is an unsubstituted or substituted lower alkyl group, l is an integer 1-5000, A is a $C_1$-$C_{10}$ alkylene group and Q is an amino group, with a compound $NC-N=C(SCH_3)NH_2$ or $NaN(CN)_2$.

4. Process for preparation of the compound of formula (II):

$$R^1(Si(CH_3)_2O)_1(SiCH_3R^2O)_m(SiCH_3AG)_n(Si(CH_3)_3$$

wherein $R^1$, l, A are as defined above, G is a cyanoguanidyl, m is an integer of 0-5000, $R^2$ is a lower aminoalkyl group, and n is an integer of 1-5000, which comprises reacting a compound of formula (II):

$$R^1(Si(CH_3)_2O)_1(SiCH_3R^2O)_m(SiCH_3AQO)_n\text{-}(Si(CH_3)_3$$

wherein the R, l, m, n nd a are the same and Q is an amino group with a compound of formula:

$$NC-N=(SCH_3)NH_2$$

or a compound of formula:

$$NaN(CN)_2.$$

5. Process for preparation of the compound of formula (II):

$$R^1(Si(CH_3)_2O)_1(SiCH_3R^2O)_m(SiCH_3AGO)_n\text{-}(Si(CH_3)_3$$

wherein $R^1$, l and A are as defined above, G is a biguanidyl, m is an integer of 0-5000, $R^2$ is a lower aminoalkyl group, and n is an integer of 1-5000, which comprises reacting a compound of formula:

$$R^1(Si(CH_3)_2O)_1(SiCH_3R^2O)_m(SiCH_3AQO)_n\text{-}(Si(CH_3)_3$$

wherein the R, l, m, n and A as defined above and Q is an amino group with a compound of formula:

$$ZNH_2$$

wherein Z is hydrogen, $C_1$–$C_{20}$ alkyl, fluoroalkyl or alkoxy.

* * * * *

UNITED STATES PATENT AND TRADEMARK OFFICE
CERTIFICATE OF CORRECTION

PATENT NO. : 5,239,100
DATED : August 24, 1993
INVENTOR(S) : Tsunetoshi et al

It is certified that error appears in the above-indentified patent and that said Letters Patent is hereby corrected as shown below:

At column 7, line 63, replace "$R^1(Si(CH_3)_2O)_1{}^1(Si(CH_3)_2)AG$" with --$R^1(Si(CH_3)_2O)_1(Si(CH_3)_2)AG$--.

At column 8, line 1, replace "$R^1(Si(CH_3)_2O)_1(SiCH_3R^2O)_m(SiCH_3AG)_n(Si(CH_3)_3$" with --$R^1(Si(CH_3)_2O)_1(SiCH_3R^2O)_m(SiCH_3AGO)_n(Si(CH_3)_3)$--.

UNITED STATES PATENT AND TRADEMARK OFFICE
CERTIFICATE OF CORRECTION

PATENT NO. : 5,239,100
DATED : August 24, 1993
INVENTOR(S) : Tsunetoshi et al

It is certified that error appears in the above-indentified patent and that said Letters Patent is hereby corrected as shown below:

At column 8, line 37, replace "$R^1(Si(CH_3)_2O)_l(SiCH_3R^2O)_m(SiCH_3AG)_n-(Si(CH_3)_3$" with --$R^1(Si(CH_3)_2O)_l(SiCH_3R^2O)_m(SiCH_3AGO)_n(Si(CH_3)_3)$--.

At column 8, line 42, delete "(II)".

At column 8, line 49, replace "$NC-N=(SCH_3)NH_2$" with --$NC-N=C(SCH_3)NH_2$--.

Signed and Sealed this

Twenty-sixth Day of July, 1994

Attest:

BRUCE LEHMAN

Attesting Officer

Commissioner of Patents and Trademarks